(12) United States Patent
Everingham

(10) Patent No.: US 6,868,732 B2
(45) Date of Patent: Mar. 22, 2005

(54) DIFFERENTIAL PRESSURE SIGNALING DEVICE AND METHOD EMPLOYING A MAGNETORESISTIVE SENSOR

(75) Inventor: Gary M. Everingham, Chatham (CA)

(73) Assignee: Siemens VDO Automotive Inc., Chatham (CA)

( * ) Notice: Subject to any disclaimer, the term of this patent is extended or adjusted under 35 U.S.C. 154(b) by 0 days.

(21) Appl. No.: 10/354,627

(22) Filed: Jan. 30, 2003

(65) Prior Publication Data

US 2004/0055365 A1 Mar. 25, 2004

Related U.S. Application Data

(60) Provisional application No. 60/414,513, filed on Sep. 25, 2002.

(51) Int. Cl.[7] .............................. G01L 9/00; G01N 3/04
(52) U.S. Cl. ......................................... 73/717; 73/49.7
(58) Field of Search ........................ 73/49.7, 715, 717, 73/722, 723, 728; 116/217; 200/83 L

(56) References Cited

U.S. PATENT DOCUMENTS

| | | | | |
|---|---|---|---|---|
| 2,876,404 A | * | 3/1959 | Hannula ...................... 318/687 |
| 3,077,176 A | * | 2/1963 | Pall et al. .................... 116/267 |
| 3,293,579 A | * | 12/1966 | Harper ........................ 335/207 |
| 4,273,976 A | * | 6/1981 | Wolford et al. ............ 200/83 L |
| 4,283,706 A | * | 8/1981 | Kimura et al. .............. 340/445 |
| 4,292,484 A | * | 9/1981 | Pruss ....................... 200/61.25 |
| 4,326,419 A | * | 4/1982 | Herden ......................... 73/708 |
| 4,343,180 A | * | 8/1982 | Herden et al. ................ 73/115 |
| 4,371,762 A | * | 2/1983 | Diamond ................. 200/61.43 |
| 4,484,173 A | * | 11/1984 | Everett ......................... 338/42 |
| 4,498,495 A | * | 2/1985 | Worwood et al. ............ 137/557 |
| 4,532,951 A | * | 8/1985 | Fermanich .................... 137/84 |
| 4,793,277 A | * | 12/1988 | Haas et al. ................ 116/34 R |
| 5,144,102 A | * | 9/1992 | Buse ......................... 200/83 Q |
| 5,437,241 A | * | 8/1995 | Rosenberg et al. ......... 116/268 |
| 5,703,552 A | * | 12/1997 | Buffet et al. ................ 335/205 |

* cited by examiner

Primary Examiner—Charles D. Garber

(57) ABSTRACT

A device and method for signaling differential pressure change occurring during leak testing of an evaporative emission control space in a motor vehicle fuel system. A casing has sensing ports one of which is communicated to a reference pressure, such as atmospheric pressure, and another of which is communicated to sense pressure in the evaporative emission control space. As difference between the reference pressure and the pressure in the control space changes, the net magnetic flux acting on a magnetoresistive sensor changes. The sensor is electrically connected to the vehicle electrical system for signaling the differential pressure. The device may be used for both positive and negative pressure leak testing.

14 Claims, 1 Drawing Sheet

DIFFERENTIAL PRESSURE SIGNALING DEVICE AND METHOD EMPLOYING A MAGNETORESISTIVE SENSOR

CROSS REFERENCE TO RELATED APPLICATION AND PRIORITY CLAIM

This application claims the benefit of U.S. Provisional Application No. 60/414,513 filed on Sep. 25, 2002 in the name of Gary Everingham and entitled DIFFERENTIAL PRESSURE SIGNALING DEVICE AND METHOD EMPLOYING A MAGNETORESISTIVE SENSOR, which is incorporated by reference herein in its entirety.

FIELD OF THE INVENTION

This invention relates generally to devices and methods for signaling differential pressure change. The inventive device and method are particularly advantageous for signaling leakage in evaporative emission control space of a motor vehicle fuel system.

BACKGROUND OF THE INVENTION

A known on-board evaporative emission control system for a motor vehicle comprises a vapor collection canister that collects volatile fuel vapors generated in the headspace of a fuel tank by the volatilization of liquid fuel in the tank and a purge valve for periodically purging fuel vapors to an intake manifold of the engine. A known type of purge valve, sometimes called a canister purge solenoid (or CPS) valve, is under the control of a microprocessor-based engine management system, sometimes referred to by various names, such as an engine management computer or an engine electronic control unit.

During conditions conducive to purging, the purge valve is opened by a signal from the engine management computer in an amount that allows intake manifold vacuum to draw fuel vapors that are present in the tank headspace and/or stored in the canister for entrainment with combustible mixture passing into the engine's combustion chamber space at a rate consistent with engine operation so as to provide both acceptable vehicle driveability and an acceptable level of exhaust emissions.

Certain governmental regulations require that certain motor vehicles powered by internal combustion engines which operate on volatile fuels such as gasoline have evaporative emission control systems equipped with an on-board diagnostic capability for determining if a leak is present in the evaporative emission control space.

One known type of vapor leak detection system for determining integrity of vapor containment space, i.e. evaporative emission control space, performs a leak detection test by positively pressurizing the evaporative emission control space using a positive displacement diaphragm pump. Associated valves, such as the purge valve and any vent valves are closed, and the diaphragm pump is reciprocated to create test pressure. Commonly owned U.S. Pat. No. 6,192,743, issued Feb. 27, 2001, discloses a module comprising such a pump.

Known test methods include operating the pump to create superatmospheric pressure in the closed space being tested and then detecting changes that are indicative of leakage. One method comprises measuring a characteristic of pump operation. An example of a time-based measurement is a measurement of how frequently the diaphragm pump must be cycled in order to maintain pressure. Other methods of measurement are pressure-based, such as measuring the rate at which pressure decays.

Another known type of vapor leak detection system for determining integrity of an evaporative emission control space performs a leak detection test by negatively pressurizing the evaporative emission control space. Negative pressurizing refers to creating vacuum, i.e. sub-atmospheric pressure. One way of creating negative pressure uses engine manifold vacuum. With the engine running, any vent valves are closed, vacuum is drawn through the purge valve which is left open, and after vacuum has been drawn, the purge valve is closed. Loss of vacuum after closing of the purge valve is an indication of leakage. Vacuum may also be created naturally in other ways, such as when the vehicle is parked and the fuel system cools.

SUMMARY OF THE INVENTION

The present invention concerns devices and methods for signaling differential pressure change, such as that which may occur during a leak test of an evaporative emission control space in a motor vehicle fuel system.

One advantage of the invention is that is may be used for both positive and negative pressure leak testing. Another advantage is that it can be embodied as a device that is well-suited for mounting in a motor vehicle in association with the vehicle fuel system. Such a device comprises a casing having sensing ports one of which is communicated to a reference pressure, such as atmospheric pressure, and another of which is communicated to sense pressure in the evaporative emission control space. The device comprises a magnetoresistive sensor electrically connected to the vehicle electrical system for signaling the pressure difference between the reference pressure and the pressure in the control space during a leak test.

One general aspect of the invention relates to a differential pressure signaling device comprising a casing divided by a movable wall to provide respective chamber spaces on opposite sides of the wall. A first sensing port communicates a first pressure to a first of the chamber spaces, and a second sensing port communicates a second pressure to a second of the chamber spaces. A signaling mechanism signals change in differential pressure between the two chamber spaces and comprises a first magnet, a second magnet, and a magnetoresistive sensor arranged such that movement of the wall that occurs in consequence of change in pressure differential between the chamber spaces changes the net magnetic flux from the magnets that act on the magnetoresistive sensor.

A further aspect of the invention relates to a differential pressure signaling device comprising a casing divided by a movable wall to provide respective chamber spaces on opposite sides of the wall. A first sensing port communicates a first pressure to a first of the chamber spaces, and a second sensing port communicates a second pressure to a second of the chamber spaces. A magnetic circuit exhibits change in a characteristic of magnetic flux in the circuit as differential pressure between the two chamber spaces changes, and a magnetoresistive sensor is arranged to respond to change in the characteristic of magnetic flux in the circuit as differential pressure between the two chamber spaces changes.

A still further aspect of the invention relates to a method for signaling change in differential pressure between first and second chamber spaces of a casing that are divided by a movable wall within the casing and to which respective pressures are communicated. The method comprises providing a magnetic circuit that exhibits change in a characteristic of magnetic flux in the circuit as differential pressure between the two chamber spaces changes, and magnetoresistively sensing change in the characteristic of magnetic flux in the circuit.

A still further aspect of the invention relates to a leak test device for a motor vehicle fuel system that holds volatile liquid fuel for operating the vehicle. The leak test device comprises a casing divided by a movable wall to provide respective chamber spaces on opposite sides of the wall. A first sensing port communicates a reference pressure to a first of the chamber spaces, and a second sensing port communicates pressure representative of pressure in evaporative emission control space of the fuel system to a second of the chamber spaces. A signaling mechanism signals change in differential pressure between the two chamber spaces and comprises a magnetic circuit that exhibits change in a characteristic of magnetic flux in the circuit as differential pressure between the two chamber spaces changes. A magnetoresistive sensor is arranged to respond to change in the characteristic of magnetic flux in the circuit as differential pressure between the two chamber spaces changes.

A still further aspect of the invention relates to a method for signaling leakage in a motor vehicle fuel system that holds volatile liquid fuel for operating the vehicle. The method comprises providing a magnetic circuit that exhibits change in a characteristic of magnetic flux in the circuit as differential pressure between a reference pressure and pressure in evaporative emission control space of the fuel system changes, and magnetoresistively sensing change in the characteristic of magnetic flux in the circuit.

BRIEF DESCRIPTION OF THE DRAWINGS

The accompanying drawings, which are incorporated herein and constitute part of this specification, include one or more presently preferred embodiments of the invention, and together with a general description given above and a detailed description given below, serve to disclose principles of the invention in accordance with a best mode contemplated for carrying out the invention.

DESCRIPTION OF THE PREFERRED EMBODIMENT

Figure 1:
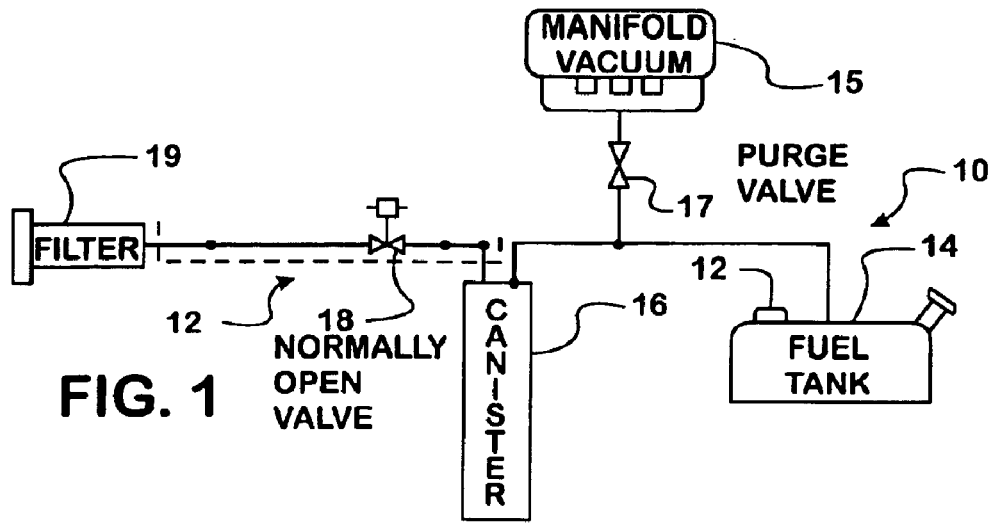
FIG. 1 is a general schematic diagram of an exemplary automotive vehicle evaporative emission control system including a leak test device embodying principles of the invention.

FIG. 1 shows an example of a portion of a motor vehicle fuel system 10, including a leak test device 12. A fuel tank 14 holds a supply of volatile liquid fuel for an engine 15 that powers the vehicle. Fuel vapors that are generated within headspace of tank 14 are collected in a vapor collection canister 16 that forms a portion of an evaporative emission control system.

At times conducive to canister purging, the collected vapors are purged from canister 16 to engine 15 through a purge valve 17. For purging, purge valve 17 and a canister vent valve 18 are both open. Vent valve 18 vents canister 16 to atmosphere through a particulate filter 19, allowing engine manifold vacuum to draw air into and through canister 16 where collected vapors entrain with the air flowing through the canister and are carried into the engine intake system, and ultimately into engine 15 where they are combusted.

From time to time, leak test device 12 is used for conducting a leak test for ascertaining the integrity of the fuel system, particularly the evaporative emission control system, against leakage. Such a test may involve either positive pressurization or negative pressurization of the evaporative emission control space.

For positive pressurization, purge valve 17 and vent valve 18 are operated closed to close off the evaporative emission control space that contains fuel vapors. That space is then positively pressurized by a pump (not shown) with subsequent decay in pressure being an indication of leakage.

For negative pressurization, purge valve 17 is left open while vent valve 18 is operated closed. AS engine 15 runs, intake manifold vacuum draws vacuum in the space being tested, and then purge valve 17 is closed. Subsequent decay in vacuum is an indication of leakage.

Figure 2:
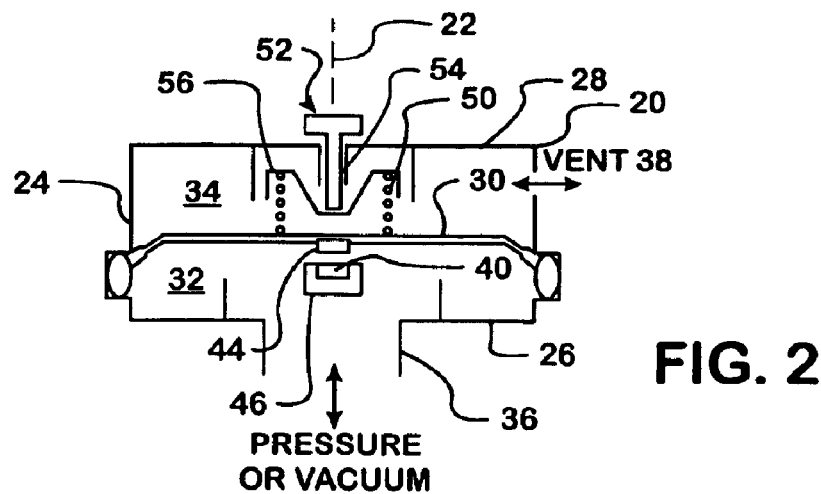
FIG. 2 is a cross section view through an exemplary embodiment of the leak test device.

FIG. 2 shows an exemplary embodiment of leak test device 12 to comprise a casing 20 having a longitudinal axis 22. Casing 20 is formed by a cylindrical tubular sidewall 24 and circular end walls 26, 28 that close opposite axial ends of sidewall 24. A movable wall 30 divides the interior of casing 20 into first and second chamber spaces 32, 34. A sensing port 36 in end wall 26 communicates chamber space 32 to vapor containment space of the evaporative emission control system. Another sensing port 38 in sidewall 24 communicates chamber space 34 to a reference pressure, typically atmospheric pressure.

A magnet 40 is disposed in a fixed location within the interior of chamber space 32. Another magnet 44 is disposed centrally on movable wall 30. A magnetoresistive sensor 46 is disposed in association with magnet 40 within chamber space 32 in an arrangement that enables it to sense the magnetic field surrounding magnet 40. The magnets are disposed in general alignment along axis 22 with an imaginary line between each magnet's poles generally aligned with the axis.

Magnet 40 is poled to oppose magnet 44. Hence, motion of magnet 44 toward magnet 40 will be met by increasing force opposing the motion.

Movable wall 30 comprises a diaphragm whose outer perimeter is held against and sealed to sidewall 24, such as being clamped between upper and lower parts of the sidewall. The central region of the diaphragm that carries magnet 44 is displaced along axis 22 as pressure differential changes.

A spring 50 and a pre-set mechanism 52 pre-set a bias force that the spring exerts on wall 30 in a direction that urges magnet 44 toward magnet 40. Mechanism 52 comprises an adjustment screw 54 threaded into end cap 28, and a spring seat 56 that fits to one end of spring 50. Turning adjustment screw 54 about axis 22 positions seat 56 along the axis, either increasing or decreasing the spring force exerted on wall 30. Pre-setting the spring force serves to calibrate device 12 so that the signal given by device 46 is properly correlated with pressure differential between the chamber spaces.

As the pressure in chamber space 32 becomes increasingly positive relative to atmospheric pressure while atmospheric pressure is maintained in chamber space 34, the movement of wall 30 away from the position shown in FIG. 2 causes magnet 44 to move increasingly farther from magnet 40, increasingly compressing spring 50 in the process. Likewise, as the pressure in chamber space 32 becomes increasingly negative relative to atmospheric pressure while atmospheric pressure is maintained in chamber space 34, the movement of wall 30 away from the centered state of balance shown in FIG. 3 will cause magnet 44 to move increasingly closer to magnet 40, with spring 50 expanding in the process.

The magnetic field of magnet 44 interacts with that of magnet 40 to alter how the magnetic field of magnet 40 acts on magnetoresistive sensor 46. Consequently, as the position of magnet 44 changes relative to magnet 40, the magnetic flux acting on magnetoresistive sensor 46 also changes.

If chamber space 32 is communicated to positive pressure for a leak test, a decrease in positive pressure that is indicative of a leak equal to or exceeding a certain size will be signaled by device 46 at some point in the movement of magnet 44 toward magnet 40. If chamber space 32 is instead communicated to vacuum, a decrease in vacuum during a leak test that is indicative of a leak equal to or exceeding a certain size will be signaled by device 46 at some point in the movement of magnet 44 away from magnet 40.

Sensor 46 is powered by a small electric current, and is capable of providing a signal that distinguishes various amounts of magnetic flux acting on it. For example, the signal may be in the nature of a signal that distinguishes flux that equals or exceeds a threshold from flux that does not. Hence, by appropriate selection of magnets, area of wall 30, and distance between magnets 40 and 44 for a certain pressure differential between chamber spaces 32, 34, device 12 can correlate the signal of sensor 46 with pressure differential such that the signal will distinguish pressure differentials that equal or exceed a threshold pressure differential from pressure differentials that do not. The selection will typically be premised on an assumption that one chamber space will be communicated to atmospheric pressure while the other will be communicated either to positive pressure or vacuum.

Figure 3:
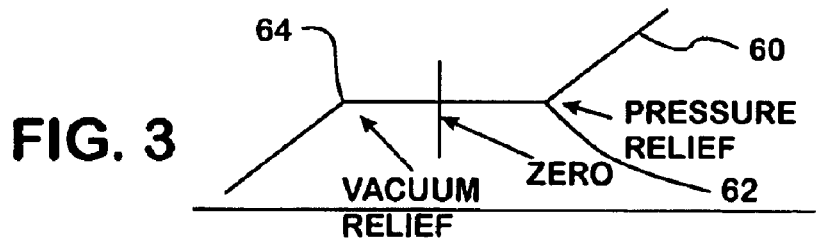
FIG. 3 is a graph plot related to operation of the device.

The graph plot 60 of FIG. 3 illustrates a representative characteristic of the signal provided by magnetoresistive sensor 46 as a function of pressure differential between chamber spaces 32, 34. When pressure decay is used as an indicator of leak size, the inflection point marked 62 can serve to define the point of demarcation between an evaporative emission control space that has an effective leak size equal to or exceeding a pre-determined threshold and one that does not. When vacuum decay is used as an indicator of leak size, the inflection point marked 64 can serve to define the point of demarcation between an evaporative emission control space that has an effective leak size equal to or exceeding a pre-determined threshold and one that does not.

The invention provides a "non-contact" type device capable of reliably detecting relatively small amounts of change in pressure differential that may be sufficient to signal whether or not leakage exceeding a pre-determined effective size is present. The device is characterized by relatively little hysteresis, and can provide a signal level sufficiently strong for use by components forming a part of the vehicle electric system.

It is to be understood that because the invention may be practiced in various forms within the scope of the appended claims, certain specific words and phrases that may be used to describe a particular exemplary embodiment of the invention are not intended to necessarily limit the scope of the invention solely on account of such use. For example, a magnetoresistive sensor includes what is sometimes referred to as a giant magnetoresistive sensor.

What is claimed is:

1. A differential pressure signaling device comprising a casing divided by a movable wall to provide respective chamber spaces on opposite sides of the wall, a first sensing port for communicating a first pressure to a first of the chamber spaces and a second sensing port for communicating a second pressure to a second of the chamber spaces, and a signaling mechanism for signaling change in differential pressure between the two chamber spaces comprising a first magnet disposed on the movable wall for movement therewith, a second magnet fixedly disposed within one of the chamber spaces and poled in magnetic opposition to the first magnet to oppose motion of the first magnet toward the second magnet, and a magnetoresistive sensor arranged relative to the magnets such that movement of the wall that occurs in consequence of change in pressure differential between the chamber spaces changes the magnetic flux acting on the magnetoresistive sensor, further including a source of bias force for biasing the magnets toward each other.

2. A differential pressure signaling device as set forth in claim 1 wherein the source of bias force for biasing the magnets toward each other comprises a bias spring.

3. A differential pressure signaling device as set forth in claim 2 including a presetting mechanism for presetting the bias force exerted by the bias spring.

4. A differential pressure signaling device as set forth in claim 3 wherein the bias spring is disposed in the other chamber space.

5. A differential pressure signaling device comprising a casing divided by a movable wall to provide respective chamber spaces on opposite sides of the wall, a first sensing port for communicating a first pressure to a first of the chamber spaces and a second sensing port for communicating a second pressure to a second of the chamber spaces, a magnetic circuit that exhibits change in a characteristic of magnetic flux in the circuit as differential pressure between the two chamber spaces changes comprising a first magnet movable with movement of the movable wall, a second magnet fixedly disposed in relation to the first magnet and poled to magnetically oppose motion of the first magnet toward the second magnet, and a magnetic resistive device arranged to respond to change in the characteristic of magnetic flux in the circuit as differential pressure between the two chamber spaces, further including a source of bias force for biasing the magnets toward each other.

6. A differential pressure signaling device as set forth in claim 5 wherein the source of bias force for biasing the magnets toward each other comprises a bias spring.

7. A differential pressure signaling device as set forth in claim 6 including a presetting mechanism for presetting the bias force exerted by the bias spring.

8. A differential pressure signaling device as set forth in claim 7 wherein the bias spring is disposed in the other chamber space.

9. A method for signaling change in differential pressure between first and second chamber spaces of a casing that are divided by a movable wall within the casing and to which respective pressures are communicated, the method comprising:

providing a magnetic circuit that comprises two magnets one of which is movable with the movable wall and the other of which is poled to oppose motion of the one magnet toward the other magnet and that exhibits change in a characteristic of magnetic flux in the circuit as differential pressure between the two chamber spaces changes, including biasing the magnets toward each other by a bias force; and magnetic resistively sensing change in the characteristic of magnetic flux in the circuit.

10. A differential pressure signaling device comprising a casing divided by a movable wall to provide respective chamber spaces on opposite sides of the wall, a first sensing port for communicating a first pressure to a first of the chamber spaces and a second sensing port for communicating a second pressure to a second of the chamber spaces, and a signaling mechanism for signaling change in differential pressure over a range spanning positive and negative differential pressures comprising a first magnet movable with movement of the movable wall, a second magnet poled to oppose motion of the first magnet toward the second magnet, a source of bias force for biasing the magnets toward each other, and a magnetoresistive sensor arranged to sense magnetic flux change resulting from motion of the first magnet relative to the second magnet.

11. A differential pressure signaling device as set forth in claim 10 wherein the first magnet is disposed on the movable wall.

12. A differential pressure signaling device as set forth in claim 11 wherein the source of bias force for biasing the magnets toward each other comprises a bias spring.

13. A differential pressure signaling device as set forth in claim 12 including a presetting mechanism for presetting the bias force exerted by the bias spring.

14. A differential pressure signaling device as set forth in claim 13 wherein the bias spring is disposed in the other chamber space.

\* \* \* \* \*